United States Patent [19]

Germain et al.

[11] 3,874,674
[45] Apr. 1, 1975

[54] SEALING DEVICES BETWEEN A DRIVE MEMBER AND A DRIVEN MEMBER CONNECTED BY DISCONNECTABLE COUPLING MEANS

[75] Inventors: Roger Louis Germain, Maisons-Laffitte; Henri Andre Rouger, Courbevoie; Jean-Paul Vives, Gennevilliers; Claude Duquenne, La Garenne, all of France

[73] Assignee: Societe Nationale d'Etude et de Construction de Moteurs d'Aviation, Paris, France

[22] Filed: May 2, 1973

[21] Appl. No.: 356,390

[30] Foreign Application Priority Data
May 8, 1972 France .............................. 72.16430

[52] U.S. Cl. ....................................... 277/8, 277/73
[51] Int. Cl. ............................................. E21b 33/00
[58] Field of Search ............... 277/5, 8, 73, 74, 3, 27

[56] References Cited
UNITED STATES PATENTS
2,835,514   5/1958   McGahan ......................... 277/74 X
2,860,895   11/1958  Mosbacher ............................ 277/8
3,072,413   1/1963   Parks ..................................... 277/8

Primary Examiner—Harry N. Haroian
Attorney, Agent, or Firm—Larson, Taylor & Hinds

[57]  ABSTRACT

At least one annular seal is situated in a plane perpendicular to the axis of rotation of the driven member and is borne by a movable support which can be moved axially under the effect of actuating means between an active position, in which it is urged towards a sealing track fast to the rotor of the driven member, and an inactive position, in which it remains separated from said sealing track. The actuating means comprises two flexible devices acting in opposition on the movable support, namely a flexible opening device which tends to bring the movable support into its inactive position, and a flexible closing device which tends to bring the movable support into its active position. The flexible closing device is placed under tension by axial displacement of a support part, locking means actuable at will enabling the maintenance of this support part in its advanced position for which it places this flexible closing device under tension.

16 Claims, 7 Drawing Figures

SEALING DEVICES BETWEEN A DRIVE MEMBER AND A DRIVEN MEMBER CONNECTED BY DISCONNECTABLE COUPLING MEANS

The invention relates to sealing devices between a drive member and a driven member coupled by disconnectable coupling means.

The invention applies more particularly, because it is in this case that its application seems to offer the most advantage, but not exclusively, among these sealing devices, to those intended to be mounted between a drive motor and a compressor for special gases (such as toxic or dangerous gases).

The sealing device then permits the drive member to be uncoupled whilst preserving sealing between the receiving member and the ambient medium.

It is hence possible within the more particularly envisaged field of application, to uncouple the drive motor (for example for purposes of overhaul, maintenance or repair) whilst preserving sealing between the compressor and said ambient medium, which avoids having to empty or to purge said compressor whose internal volume can hence remain occupied by the toxic or dangerous gas on which the compressor is working.

Sealing devices of this type are known which comprise at least one annular seal situated in a plane perpendicular to the axis of rotation of the driven member, this annular seal being borne by a movable support which can be moved axially (that is to say parallel to the axis of the drive member-driven member assembly), under the effect of actuating means, between an active position in which it is urged towards a sealing track fast to the rotor of the driven member and an inactive position in which it remains separated from said sealing track.

Now hitherto actuating means for the movable support were relatively complicated and resulted in expensive construction of the sealing device.

To this end, there has already been proposed a solution which consists of urging the movable support bearing the annular seal towards its active position by flexible return means. Under these conditions, for the inactive position of the annular seal, the flexible return means are permanently stretched and retained by a locking system; in consequence there is a risk of inadvertant operation if this locking system is defective. Moreover, this solution presents a relatively important danger since considerable energy is generally stored in these return means, and in the course of dismounting operation this energy is liberated and can cause accidents.

There has also been proposed a converse solution, which consists of urging the movable support bearing the annular seal, towards its inactive position, by flexible return means. It is then necessary, in order to effect the placing in active position of the annular seal, to have recourse to drive means (such as hydraulic jacks) to act in opposition on these flexible return means. Now in order to ensure the maintenance of the annular seal in active position, it is not conceivable to unlock the movable support, and the action of the return means must then be permanently opposed by the action of the drive means. It will be understood that this solution presents serious drawbacks since it is precisely on the occurrence of any defect that sealing must be effective. The drive means (in particular the hydraulic circuit supplying the hydraulic jacks) can be the site of this defect which it is desired to remedy; to obtain good safety with a solution of this type, a double hydraulic circuit should be provided, which of course would complicate the device and increase its cost price.

It is an object of the invention to provide a sealing device whose actuating means are simpler than those known hitherto.

It is a further object of the invention to provide a sealing device, which due to the simplicity of the actuating means, can be produced at a lower cost price than prior sealing devices.

The invention also relates to a sealing device whose actuating means are controlled hydraulically and can be arranged to provide indications of supervision and control on the open or closed condition of the device.

It is a further object of the invention to provide a sealing device which, due to the conception of the control means, is more reliable than those known hitherto.

The sealing device according to the invention is characterised by the fact that the control means comprise two flexible devices acting in opposition on the movable support, namely a first flexible device, called "opening device," which tends to bring the movable support into its inactive position, and the second flexible device, called "closing device," which tends to bring the movable support into its active position, and by the fact that the flexible closing device is placed under tension by an axial displacement (that is to say parallel to the axis of the drive member-receiving member assembly) of a support part, locking means actuable at will ensuring the maintenance of this support part in its so-called "advanced position" for which it places the flexible closing device under tension.

According to a preferred feature of the invention, the axial displacement of the support part is controlled hydraulically, and the locking means are also controlled hydraulically.

According to another preferred feature of the invention, the flexible opening device is constituted by at least one flexible washer inserted between the movable support and a fixed part of the device, and the flexible closing device is constituted by at least one flexible washer inserted between the movable support and the support part, the flexible washer of the flexible opening device having a stiffness less than that of the flexible washer of the flexible closing device.

The invention consists, apart from the features which have just been considered, of certain other features which are preferably used at the same time and which will be more explicitly considered below.

The invention will in any case, be well understood with the aid of the additional description which follows as well as of the accompanying drawings, which description and drawings relate to preferred embodiments of the invention and do not of course imply any limiting character.

FIG. 1 of these drawings is a sectional view of one embodiment of a sealing device according to the invention, the device being shown in its open configuration.

Figure 1:
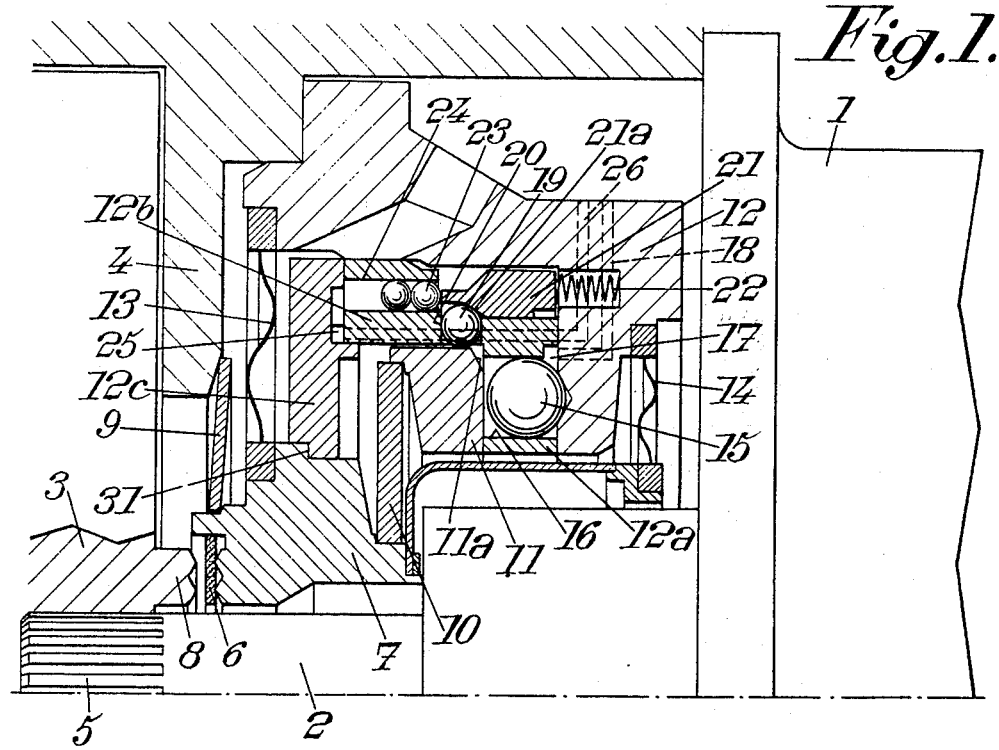
Figure 2:
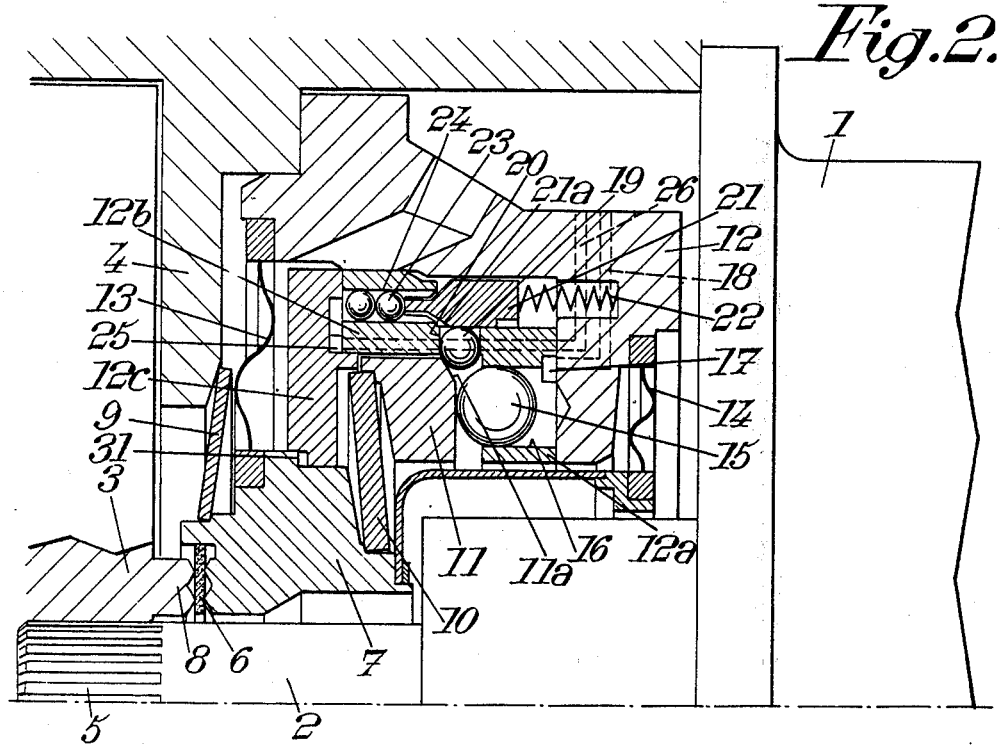
FIG. 2 shows, under the same conditions, the embodiment of FIG. 1 in its closed configuration.
Figure 3:
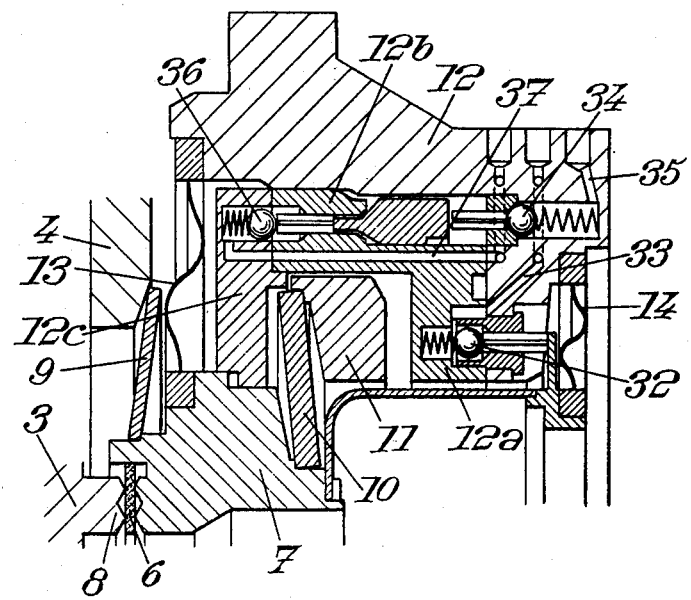
FIG. 3 shows in section the same embodiment in its closed configuration, this section showing members of the device arranged to control various configurations that the sealing device can assume.
Figure 7:
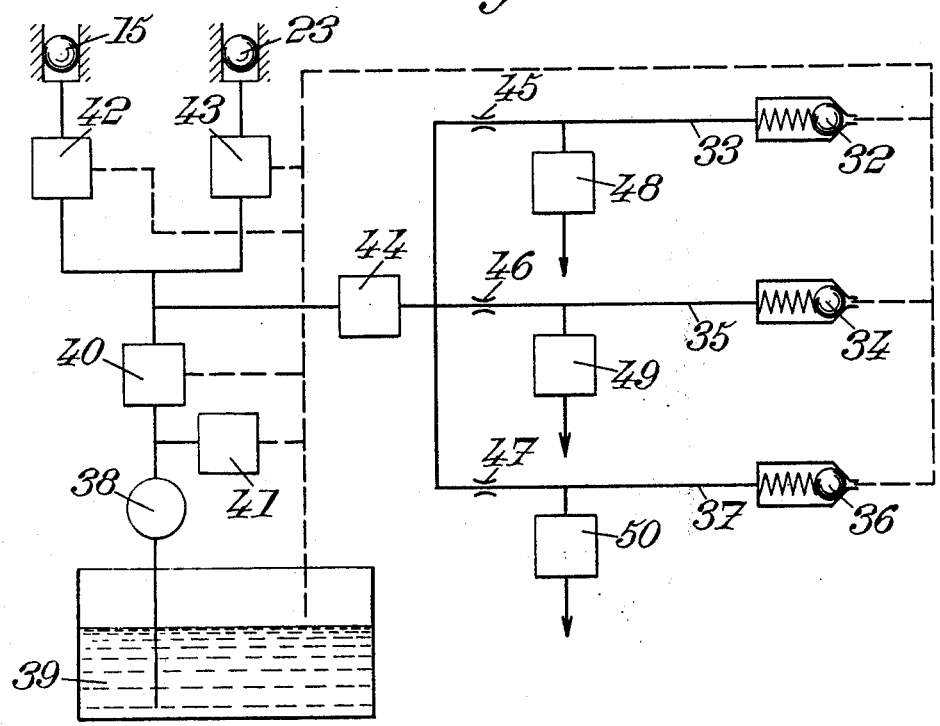

FIG. 7 lastly, is a diagram of the control of the embodiment of the sealing device of FIGS. 1, 2 and 3.

Figure 4:
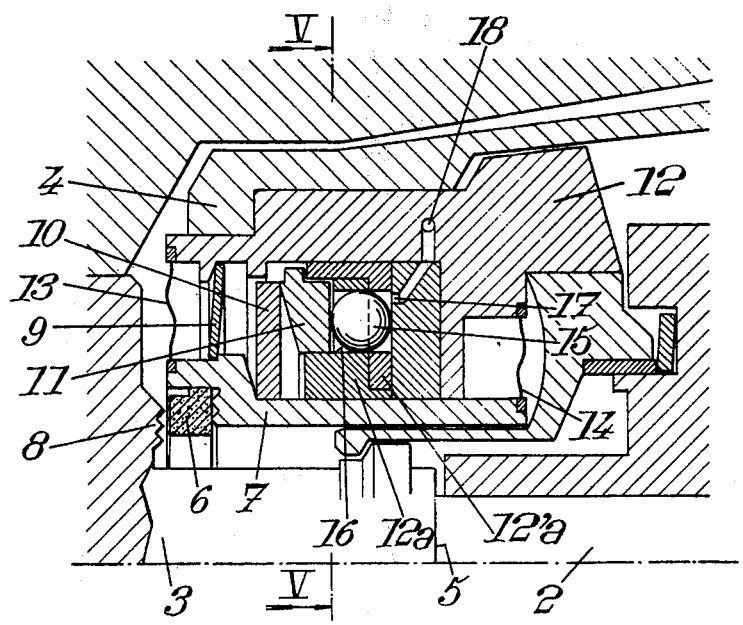
FIG. 4 is a section of another embodiment of a sealing device according to the invention, the device being shown in its open configuration.

In FIGS. 1 and 4, there is shown in section a sealing device mounted between a drive motor and a compressor for toxic or dangerous gases, this drive motor being connected to the compressor by uncouplable coupling means.

In FIG. 1, the drive motor is partially represented at 1 and it comprises an output shaft 2.

In FIG. 4, only the output shaft 2 of the motor is shown.

As for the compressor, it comprises a rotor 3 and a casing 4.

The output shaft 2 of the drive motor is connected to the rotor 3 of the compressor by uncouplable coupling means 5, such for example as grooved means which are uncouplable by axial displacement of the output shaft 2 with respect to the rotor 3.

As shown in these FIGS. 1 and 4, the sealing device comprises an annular seal 6 located in a plane perpendicular to the axis of rotation of the rotor 3 of the compressor, this annular seal 6 being borne by a movable support 7 which can be axially displaced, under the effect of control means, between an active position for which it is urged towards a sealing track or face 8 fast to the rotor 3 of the compressor and an inactive position for which it remains separated from said sealing track 8.

The control means of the movable support comprise two elastic devices acting in opposition on the movable support 7, namely a first flexible opening device 9 which tends to bring the movable support 7 into its inactive position, and a second flexible closing device 10 which tends to bring the movable support 7 into its active position.

The elastic closing device 10 is placed under tension by axial displacement of a support part 11, locking means actuable at will ensuring the maintenance of this support part 11 in its advanced position for which it places the flexible closing device 10 under tension.

The movable support 7 is advantageously connected to a fixed part 12 of the device by:

at least one deformable fluid-tight wall 13 situated, with respect to the flexible closing device 10, on the side of the drive motor 1, and at least one deformable fluid-tight wall 14 situated, with respect to the elastic closing device 10, on the side of the rotor 3 of the compressor.

These deformable walls 13 and 14 ensure fluid-tightness between the fixed part 12 and the movable support 7 and also ensure the guidance of said movable support 7.

Preferably, the axial displacement of the support part 11 is hydraulically controlled; to this end, the support part 11 has an annular shape and there is provided a plurality of actuating pistons 15, advantageously constituted by balls, distributed regularly on one side of said support part 11. These actuating pistons 15 slide in cylinders 16 arranged axially (that is to say parallel to the axis of the motor-compressor assembly) in one part 12a fast to the fixed part 12, these cylinders being connected by a distributing groove 17 supplied with liquid under pressure through a passage 18.

As for the locking means ensuring the maintenance of the support part 11 in its advanced position for which it places the elastic closing device 10 under tension, they can also be hydraulically controlled. In the embodiment illustrated in FIG. 1, these locking means comprise one or preferably several bolts 19, advantageously constituted by balls, sliding in bores 20 formed radially in a part 12b surrounding the support part 11 and fast to the fixed part 12, these bores 20 being arranged at the level of the support part 11.

These bolts 19 are urged radially towards the support part 11 by an annular piston 21 provided with an inclined ramp 21a on its inner edge and pushed by locking springs 22, so that when the support part 11 occupies its withdrawn position for which it does not place the flexible closing device 10 under tension, the bolts 19 come into abutment against said support part 11, and when the support part 11 occupies its advanced position for which it places the elastic closing device 10 under tension, the bolts 19 can be engaged in an inclined ramp 11a formed on the outer edge of said support part 11, said bolts 19 being held in this position by an inner wall of the annular piston 21.

Unlocking pistons 23, advantageously constituted each by two balls, sliding in cylinders 24 formed axially in the part 12b, are provided to push back the annular piston 21 against the action of locking springs 22, so that when these unlocking pistons 23 are hydraulically actuated the support part 11, urged by the flexible opening device 9, drives out the bolts 19 due to the inclined ramp 11a. These cylinders 24 are connected by a distributing groove 25 supplied with liquid under pressure through a passage 26.

In the embodiment illustrated in FIG. 4, the locking means are constructed by arranging the cylinders 16, in which the actuating pistons 15 slide, in two parts. To this end, the part 12a in which the cylinders 16 are arranged comprises a rotary part 12'a arranged opposite the support part 11 and capable of occupying a normal position for which each cylinder 16 is constituted by two axial fractions of a bore, and a displaced position for which the fraction of the bore situated in the rotary portion 12'a has pivoted through an equal angular value, for example by half of the cylinder spacing. Under these conditions, when the support part 11 occupies its withdrawn position for which it does not place the flexible closing device 10 under tension, the rotary portion 12'a occupies its normal position, and when the support part 11 occupies its advanced position for which it places the flexible closing device 10 under tension, the rotary portion 12'a occupies its displaced position and the control pistons 15 then become supported on the face of said rotary portion 12'a.

Figure 5:
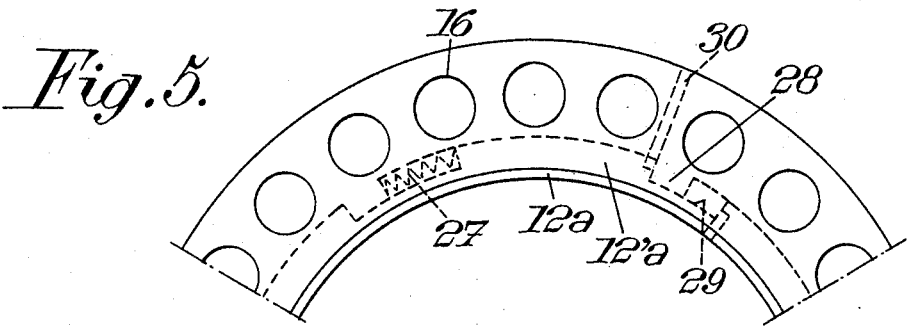
FIG. 5 is a section along the line V—V of FIG. 4.
Figure 6:
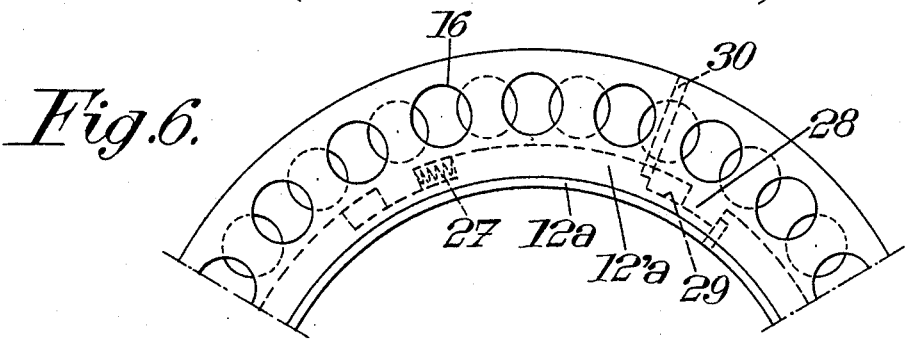
FIG. 6 is a similar section, but corresponding to the device in its closed configuration.

The passage of the rotary portion 12'a from its normal position to its displaced position is ensured hydraulically and its return from its displaced position to its normal position is ensured by a return spring 27, visible in FIGS. 5 and 6, in which the same reference numerals denote the same members as in FIG. 4.

To this end, the rotary part 12'a comprises a radial excrescence 28 which is displaced into an adjusted housing 29 supplied with liquid under pressure through a passage 30.

It would also be possible, according to a modification — not shown — , to cause the rotation of the rotary portion in the direction of locking, by the action of springs, and the reverse rotation of said rotary portion, by the action of a hydraulic jack.

According to an advantageous feature of the invention, illustrated in FIGS. 1 and 4, the flexible opening device 9 is constituted by a flexible washer inserted between the movable support 7 and the casing 4 of the compressor, and the flexible closing device 10 is constituted by a flexible washer inserted between the movable support 7 and the support part 11. The flexible washer of the flexible opening device 9 has a stiffness and a load — once in position — less than those of the flexible washer of the flexible closing device 10.

The flexible washer constituting the flexible opening device 9 is arranged and positioned to be always under tension; this flexible washer is placed under its highest tension due to the displacement of the movable support 7 from its inactive position to its active position.

The operation of the sealing device shown in FIG. 1 is then as follows.

When the compressor is in operation, or is stopped without the need for obtaining fluid-tightness, the actuating pistons 15 are at the bottom of their corresponding cylinders 16, in contact with a fixed part 12; the annular piston 21 is held by locking springs 22 against the bolts 19, themselves in abutment against the support part 11.

The flexible washer of the flexible closing device 10 is flat, and the flexible washer of the flexible opening device 9 is slightly deformed to maintain contact at 31 between the movable support 7 and a part 12c fast to the fixed part 12, and to leave the annular seal 6 separated from the fluid-tight track 8.

When the compressor is stopped and it is necessary to obtain fluid-tightness, the control pistons 15 are supplied with fluid under pressure; the support part 11 moves from its withdrawn position to its advanced position, the flexible washer of the flexible closure device 10 is placed under tension as well as the flexible washer of the flexible opening device 9; the annular seal 6 comes into fluid-tight contact with the sealing track 8.

Simultaneously the bolts 19, no longer encountering the stop of the support part 11, become engaged under the inclined ramp 11a of the support part 11, under the action of the thrust of the ramp 21a of the annular piston 21, which itself undergoes the thrust of the locking springs 22. Thus the device becomes locked in a fluid-tight configuration; in this position, the bolts 19 are prevented from being moved by the inner wall of its annular piston 21.

This configuration is illustrated in FIG. 2, in which the same reference numerals denote the same members as in FIG. 1.

The supply of liquid under pressure to the control pistons 15 can then be discontinued and retraction of the drive motor 1 and of its output shaft 2 can then be effected.

When it is desired to restore the compressor into operation after having replaced the drive motor 1 and its output shaft 2, the has been 19 are relieved by supplying the control pistons 15 with fluid under pressure; the unlocking pistons 23 are then supplied with liquid under pressure, which displaces the annular piston 21 against the action of the locking springs 22. 11a An indication is then given by means — which will be more explicitly considered below — and indicates that the unlocking has effected; the purging of the control pistons 15 is then permitted. This purge having been effected, the support part 11 is urged towards its withdrawn position by means of the movable support 7, itself urged by the flexible washer of the flexible opening device 9, and the flexible washer of the flexible closing device 10 is relaxed; the inclined ramp 11a of the support part 11 pushes back the bolts 19 and the supply of liquid under pressure to the unlocking pistons 23 can then be discontinued.

The flexible washer of the flexible opening device 9 re-establishes contact at 31 between the movable support 7 and the part 12c fast to the fixed part 12. The annular seal 6 is then separated from the sealing track 8.

A similar description of the operation of the sealing device shown in FIG. 4 could be made, only the operations of locking and unlocking being effected differently, by manipulation of the rotating portion 12'a of the portion 12a of the fixed part 12.

Due to the sealing device constructed as has just been stated, it is possible to effect checking of the various configurations by the appearance of a signal of rise in pressure of the liquid.

In FIG. 3, in which the same reference numerals denote the same members as in FIGS. 1 and 2, there are shown different means for effecting these checks.

For a check indicating "open configuration," that is to say enabling the placing of the compressor in operation, the movable support 7 occupies an inactive position for which a valve 32 is closed, whilst said valve 32 is open (FIG. 3) when the movable support 7 occupies its active position for which the annular seal 6 is supported against the sealing track 8. This valve 32 is mounted in a low pressure liquid circuit 33 and when it is closed it causes a rise in pressure upstream.

For a check indicating "sealed configuration," that is to say enabling withdrawal of the drive motor 1 and its output shaft 2, the annular piston 21 occupies an advanced position for which the bolts 19 are active, and for this advanced position of the annular piston 21 a valve 34 is closed (FIG. 3), while said valve 34 is open when the annular piston 21 occupies its withdrawn position for which the bolts 19 are inactive. This valve 34 is mounted in a low pressure liquid circuit 35 and when it is closed it causes a rise in pressure upstream.

For a check indicating "unlocking configuration," that is to say enabling cessation of the supply of the control pistons 15, the annular piston 21 agains occupies an advanced position for which the bolts 19 are again engaged under the support part 11, and for this advanced position of the annular piston 21, a valve 36 is opened (FIG. 3), while said valve 36 is closed when the annular piston 21 occupies its withdrawn position, which enables the bolts 19 to come back into inactive position under the effect of the ramp 11a. This valve 36 is mounted in a low pressure liquid circuit 37 and when it is closed it causes a rise in pressure upstream.

It should be indicated lastly that the assembly of the members constituting the sealing device bathe in a liquid, such as oil, which ensures the different actuations (supply of the control pistons and of the unlocking pistons), and which ensures the different checks (supply of the check valves), this liquid being at the pressure of the return circuit during all the resting periods of the device, that is to say during all the periods where there is no change in the configuration of the device.

Only certain pipes are under pressure during the manoeuvres of changing configuration.

Finally, the control of a sealing device such as that shown in FIGS. 1, 2 and 3 is extremely simple as can be observed in FIG. 7, in which the same reference numerals denotes the same members as in FIGS. 1, 2 and 3.

There is therefore provided a pump 38, aspirating from a low pressure tank 39 and circulating, on one hand, into a pressure regulator 40 and, on the other hand, into a safety valve 41 ensuring return to the reservoir.

This pressure regulator 40 supplies two electrovalves 42 and 43 actuating respectively the supply of the control pistons 15 and of the unlocking pistons 23.

This pressure regulator 40 also supplies a reducing valve 44 which is connected, through throttles 45, 46, 47, three check valves 32, 34, 36.

Pressostats 48, 49, 50 are respectively connected in circuits 33, 35, 37 ending at the abovesaid check valves 32, 34, 36, the abovesaid pressostats 48, 49, 50 delivering electrical check signals which can be utilised in various forms.

In conclusion, the sealing device according to the invention is particularly simple and inexpensive to produce.

Moreover, its operation and reliability are fully adapted to application to a motor-compressor unit working with a toxic or dangerous gas.

As is self-evident and as emerges already from the foregoing, the invention is in no way limited to those of its types of application and embodiments which have been more especially envisaged; it encompasses, on the contrary, all modifications.

We claim:

1. Sealing device between a drive member and a driven member connected by disconnectable coupling means, comprising at least one annular seal situated in a plane perpendicular to the axis of rotation of the driven member, said annular seal being borne by a movable support which can be moved axially between an active position, in which it is urged towards a sealing face provided on the driven member, and an inactive position, in which it remains separated from said sealing face, actuating means for effecting axial movement of said movable support, said actuating means comprising two flexible devices acting in opposition on the movable support, namely a flexible opening device which tends to bring the movable support into its inactive position, and a flexible closing device which tends to bring the movable support into its active position, an axially displaceable support part for placing said flexible closing device selectively under tension upon displacement of the support part to an advanced position, and locking means actuable at will for selectively maintaining said support part in its advanced position in which it places said flexible closing device under tension.

2. Device according to claim 1, including hydraulically actuated means arranged to effect axial displacement of the support part.

3. Device according to claim 1, wherein said locking means comprise hydraulically actuated locking means.

4. Device according to claim 1, wherein the flexible opening device is constituted by at least one flexible washer, inserted between the movable support and a fixed portion of the device, and the flexible closing device is constituted by at least one flexible washer inserted between the movable support and the support part, the flexible washer of the flexible opening device having a stiffness and a load, after positioning, less than those of the flexible washer of the flexible closing device.

5. Device according to claim 4, wherein the flexible washer of the flexible opening device is arranged so as to be always under tension whatever the position of the movable support.

6. Device according to claim 4, wherein the flexible washer of the flexible opening device is placed under the highest tension by the displacement of the movable support to its active position.

7. Device according to claim 1, wherein the movable support is connected to a fixed part of the device by at least two deformable sealing walls.

8. Device according to claim 2, wherein the support part is actuated by a plurality of actuating pistons sliding in cylinders arranged axially in a fixed part.

9. Device according to claim 8, wherein each actuating piston is constituted by a ball.

10. Device according to claim 8, wherein the locking means comprise at least one bolt sliding in a bore formed radially in a fixed part surrounding the support part, said bolt being urged radially towards the support part by an annular piston pushed by locking springs, so that, when the support part occupies its withdrawn position, the bolt comes into abutment against said support part, and when the support part occupies its advanced position the bolt comes into engagement under said support part, the locking means also comprising unlocking pistons placed and arranged to push back the annular piston against the effect of the locking springs, so that when said unlocking pistons are hydraulically actuated, the support part, urged by the flexible opening device drives out the bolt.

11. Device according to claim 8, wherein the locking means are formed by arranging the cylinders in which the actuating pistons slide in two portions, the part in which said cylinders are arranged comprising a rotary portion arranged opposite the support part and capable of occupying a normal position, in which each cylinder is constituted by two coaxial fractions of a bore, and a displaced position in which the fraction of the bore situated in the rotary portion has pivoted to constitute a support for the actuating pistons.

12. Device according to claim 11, wherein the passage of the rotary portion from its normal position to its displaced position is effected hydraulically, and its return from its displaced position to its normal position is effected by a return spring.

13. Device according to claim 1, including an assembly of control valves mounted respectively in low pressure liquid circuits, each of said valves being positioned and arranged so as to be closed for a predetermined position of certain movable members of the device and thus to cause an increase in pressure again in the circuit concerned, which characterises the position of the corresponding member of the device.

14. Device according to claim 1, wherein the assembly of members constituting the device is immersed in a liquid, which ensures the different actions, said liquid being at the pressure of the return circuit during all the inactive periods of the device, that is to say during all the periods when there is no change in configuration of the device.

15. Device according to claim 14, wherein said liquid is oil.

16. Device according to claim 14, wherein said liquid also ensures the different controls.

* * * * *